United States Patent [19]

Sugisaki et al.

[11] 4,065,798
[45] Dec. 27, 1977

[54] CLEANING CARTRIDGE

[75] Inventors: Tsutomu Sugisaki; Hideomi Watanabe, both of Odawara, Japan

[73] Assignee: Fuji Photo Film Co., Ltd., Minami-Ashigara, Japan

[21] Appl. No.: 717,836

[22] Filed: Aug. 26, 1976

[30] Foreign Application Priority Data

Aug. 26, 1975 Japan .......................... 50-117302[U]
Aug. 26, 1975 Japan .......................... 50-117303[U]

[51] Int. Cl.² .............................................. G11B 5/41
[52] U.S. Cl. .................................. 360/128; 15/210 R
[58] Field of Search ........................ 360/128; 15/210 R

[56] References Cited

U.S. PATENT DOCUMENTS 2,992,447  7/1961  Hicks .................................. 15/210 R
3,069,815  12/1962  Valentine ........................... 15/210 R

FOREIGN PATENT DOCUMENTS 2,441,755  3/1975  Germany ............................. 360/128

Primary Examiner—Robert S. Tupper
Attorney, Agent, or Firm—Sughrue, Rothwell, Mion, Zinn and Macpeak

[57] ABSTRACT

A cartridge for cleaning a magnetic head for use with flexible discs. The cartridge contains a cleaning disc comprising a flexible and non-magnetic support, with a magnetic layer provided on one or both surfaces of the flexible and non-magnetic support. A fibrous material layer is provided on one layer of the magnetic layers where both surfaces of the cleaning disc carry a magnetic layer or on the surface free of a magnetic layer when only one surface carries a magnetic layer. The flat box-like cartridge has a lubricating layer provided on the inner surface thereof which faces the exposed magnetic layer of the cleaning disc, and is capable of rotatably accomodating the cleaning disc.

2 Claims, 8 Drawing Figures

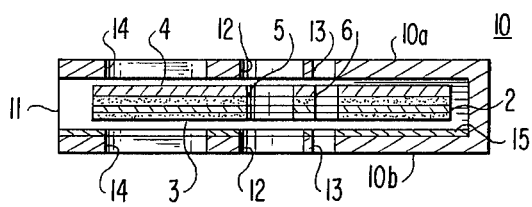
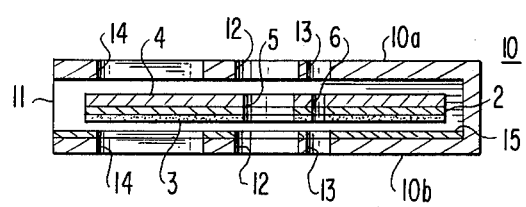
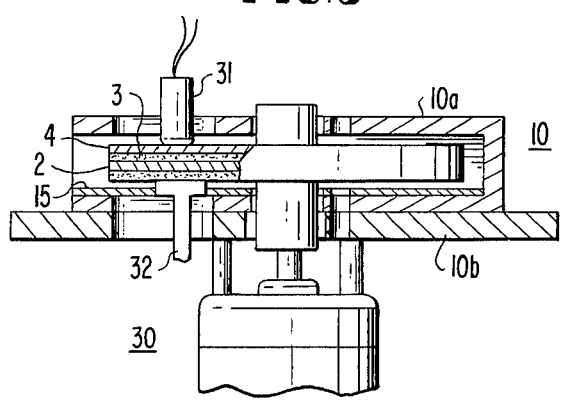
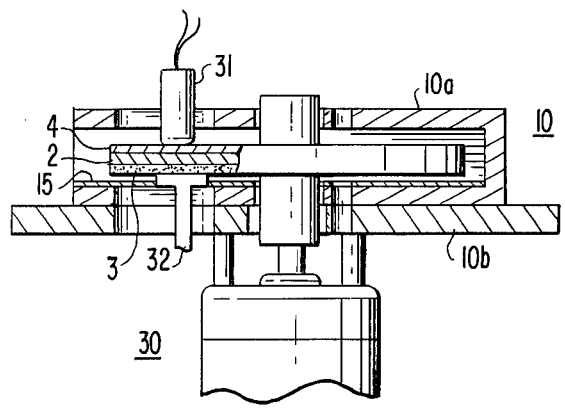

CLEANING CARTRIDGE

BACKGROUND OF THE INVENTION

1. Field of the Invention

The present invention relates to a cartridge for magnetic heads, more particularly, to a cartridge for magnetic heads for a flexible disc.

2. Description of the Prior Art

Magnetic recording systems for memory presently used include magnetic disc systems, magnetic tape systems, cassete tape systems, etc., and magnetic disc systems can be used with ease because of their high recording density, but they suffer from the disadvantage of high cost. On the other hand, a magnetic tape occupies high space and cannot be used with ease as compared with a magnetic disc, etc. With regard to cassete tape systems, they are compact and can be used with ease, but the recordable amount is low and reliability is low.

Recently, therefore, flexible disc systems having the advantages above, i.e., high recording density, compactness, and ease of handling, have been used.

In general, where a magnetic recording member is kept in contact with a magnetic head for a long period of time in magnetic recording, a part of the magnetic recording layer is scraped off or lubricant, etc., present in small amounts accumulates on the magnetic recording layer, resulting in a reduction in output.

Scraping off of a part of the magnetic recording layer and the accumulation of lubricant, etc., could be solved by improving the magnetic recording layer.

However, since magnetic recording is carried out through contact between the magnetic head and the magnetic recording layer, it is quite difficult to provide a magnetic recording layer with absolutely perfect strength.

Accordingly, so long as the present magnetic recording members and the magnetic recording systems are employed, it is necessary to clean contaminants on the magnetic head by some method.

In the case of flexible disc systems, since the magnetic head is generally positioned in the inner part thereof, it has been impossible to clean the same in a simple manner using a cloth soaked with a liquid cleaner, etc., as in conventional open reel tape recorders, cassete recorders, home video recorders, and video recorders for broadcasting. To clean these magnetic heads, a magnetic head cleaning tape has conveniently been used which is produced by providing an abrasive such as fused alumina, silicon carbide, chromium oxide ($Cr_2O_3$), corundum, and the like on a polyester base or the like using a binder. This method removes part of the magnetic recording layer and accumulated lubricant, etc., but it suffers from the disadvantage that it also scrapes off or scratches the magnetic head. The same problems are encountered in cleaning heads for video magnetic sheets.

SUMMARY OF THE INVENTION

Thus, it is an object of the present invention to provide a cartridge which eliminates the inconveniences and disadvantages associated with prior art cleaning methods and apparatus, is able to effect cleaning in a very short period of time without accelerating damage of the magnetic head, is relatively cheap, and can be handled with ease.

This object is attained by using a cartridge comprising a cleaning disc comprising a flexible and non-magnetic support, magnetic layers provided on both surfaces of the flexible and non-magnetic support, and a fibrous material layer provided on one layer of the magnetic layers, or a magnetic layer provided on one surface of the flexible and non-magnetic support, and a fibrous material layer provided on the other surface thereof; and a flat box-like cartridge wherein a lubricating layer is provided on the inner surface facing the magnetic layer of the cleaning disc, and which is able to rotatably accomodate the cleaning disc.

BRIEF DESCRIPTION OF THE DRAWINGS

FIGS. 4A and 4B are sectional views taken along line I–I' of FIG. 3 where the cleaning disc is in accordance with the dual-magnetic layer embodiment of the present invention, mounted on a recorder for flexible discs.

FIG. 5 illustrates a magnetic head being cleaned using a cartridge of the present invention in accordance with the dual-magnetic layer embodiment of the present invention, mounted on a recorder for a flexible disc.

FIG. 6 illustrates a magnetic head being cleaned using a cartridge of the present invention in accordance with the mono-magnetic layer embodiment of the present invention, mounted on a recorder for a flexible disc; where:

Figure 1:
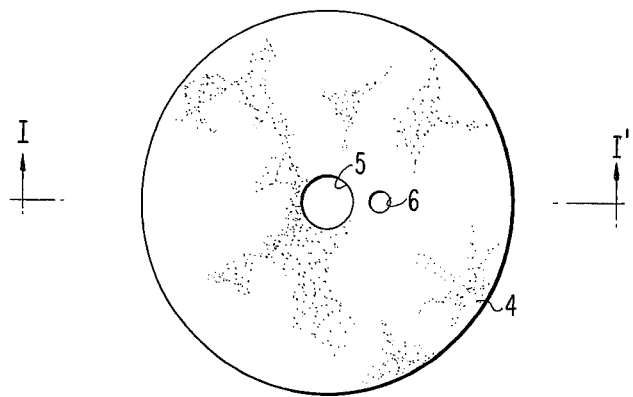
FIG. 1 is a plane view of the cleaning disc of the present invention in accordance with either the dual-layer or the mono-magnetic layer embodiment of the present invention.

1 is the cleaning disc, 2 is a support, 3 is a magnetic layer or layers, 4 is a fibrous material layer, 10 is the cartridge and 15 is a lubricating layer.

DETAILED DESCRIPTION OF THE INVENTION

Hereinafter, one embodiment of the cartridge of the present invention will be explained with reference to the accompanying drawings.

In the drawings, like numerals are utilized to identify like elements.

Figure 2A:
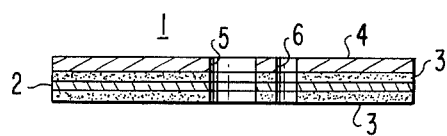
FIG. 2A is a sectional view taken along line I–I' of FIG. 1 for the dual-magnetic layer embodiment of the present invention and FIG. 2B is a sectional view taken along line I–I' of FIG. 1 for the mono-magnetic layer embodiment of the present invention.
Figure 2B:
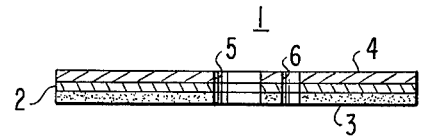
Figure 3:
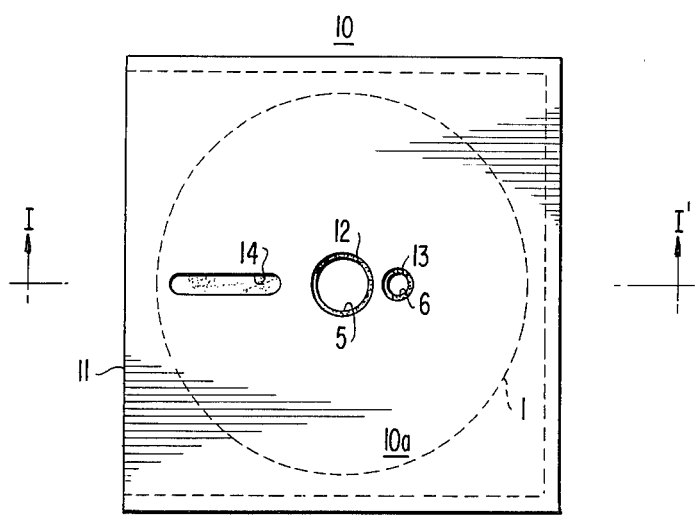
FIG. 3 is a plane view of a cartridge of the present invention in accordance with either the dual-magnetic layer embodiment of the present invention or the mono-magnetic layer embodiment of the present invention.

FIGS. 1 and 3 deal with either the dual or mono-magnetic layer embodiment of the present invention, FIGS. 2A, 4A and 5 deal with the dual magnetic layer embodiment of the present invention, and FIGS. 2B, 4B and 6 deal with the mono-magnetic layer embodiment of the present invention.

Detailed description is given below primarily on the dual-magnetic layer embodiment of the present invention, and it will be appreciated, of course, that this disclosure applies with equal force to the mono-magnetic layer embodiment of the present invention, the only difference of substance between the dual-magnetic layer embodiment of the present invention and the mono-magnetic layer embodiment of the present invention being that in the former magnetic layers are provided on both surfaces of the flexible and non-magnetic support whereas in the latter a magnetic layer is provided on a one surface of the flexible and non-magnetic support, and, further, of course, that in the former the fiberous material is provided on one of the magnetic layers whereas in the latter embodiment the fiberous material is provided on the surface of the flexible and non-magnetic support which is free of a magnetic layer.

In FIGS. 1 and 2, reference numeral 1 indicates a cleaning disc comprising a doughnut-like flexible and non-magnetic support 2 with a central hole 5 and a hole for the passage of light 6 provided therethrough, magnetic layers 3 provided on both surfaces of the support 2, and a fibrous material layer 4 provided only on one layer of the magnetic layers.

As the support, sheets made of polyvinyl chloride, polycarbonate, an acrylonitrile-styrene copolymer, an ABS resin, a polyester such as polyethylene terephthalate or polyethylene naphthalate, etc., a polyester resin such as polyethylene terephthalate or polyethylene naphthalate, etc., with glass fiber incorporated therein, cellulose derivatives, e.g., cellulose acetate butyrate, cellulose diacetate butyrate, cellulose triacetate butyrate, and the like, thick paper, metal plates of aluminum, copper, and the like, glass plates, etc., can be used.

The thickness of the support preferably ranges from about 10 $\mu$ to about 1 mm and can be selected depending upon the purpose of the unit.

Magnetic layer 3 is provided by coating a magnetic coating dispersion, which is prepared by mixing a known ferromagnetic fine powder and a binder in a proportion of about 10 to about 200 parts by weight of the binder per 100 parts by weight of the ferromagnetic fine powder, and, if desired, furthermore adding thereto a dispersing agent, a lubricant, an abrasive, an organic solvent, etc., on one or both surface of the support, depending on the embodiment.

Ferromagnetic fine powders which can be used herein include $\gamma$-$Fe_2O_3$, Co-containing $\gamma$-$Fe_2O_3$, $Fe_3O_4$, Co-containing $Fe_3O_4$, $CrO_2$, Co-Ni-P alloy, Fe-Co-Ni alloy, and the like, as described in Japanese Patent Publication Nos. 14090/1969, 18372/1970, 22062/1972, 22062/1972, 22513/1972, 28466/1971, 38755/1971, 4286/1972, 12422/1972, 17284/1972, 18509/1972, 18573/1972, etc. While not to be construed as mandatory, best results are obtained in accordance with present invention when the particle size of the ferromagnetic fine powder utilized is such that it has a length of about 0.2 to about 5 $\mu$ and an acicular ratio of about 1/1 to about 20/1.

Binders as used herein are thermoplastic resins having a softening point of not more than about 150° C, an average molecular weight of about 10,000 to about 20,000, and a degree of polymerization of about 200 to about 500, such as a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacrylic acid ester-acrylonitrile copolymer, a methacrylic acid ester-vinylidene chloride copolymer, a methacrylic acid ester-styrene copolymer, a urethane elastomer such as a compound of a diisocyanate and a polyol, etc., polyvinyl fluoride, a vinylidene chloride-acrylonitrile copolymer, a butadiene-acrylonitrile copolymer, a polyamide resin such as nylon-6, nylon-6,6 or nylon-6,10, etc., polyvinyl butyral, cellulose derivatives (e.g., cellulose acetate butyral, cellulose diacetate, cellulose triacetate, cellulose propionate, nitrocellulose, and the like), a styrene-butadiene copolymer, a polyester resin such as polyethylene terephthalate or polyethylene naphthalate, etc., a chlorovinyl ether-acrylic acid ester copolymer, various kinds of synthetic rubber based thermoplastic resins such as neoprene rubber, isoprene rubber, styrene-butadiene rubber, etc., and mixtures thereof, as described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1972, etc.

In addition, those thermosetting resins or reactive type resins can be used which have a molecular weight of not more than about $2 \times 10^5$ as coating solutions thereof and whose molecular weight becomes essentially infinite through reactions such as condensation, addition, etc., on heating after coating and drying. These thermosetting resins or reactive type resins are described in Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972, 28922/1972, etc. Of these resins, those resins are preferred which do not soften or melt before the heat-decomposition thereof.

For example, a phenol resin, an epoxy resin, a polyurethane hardening type resin, a urea resin, a melamine resin, an alkyd resin, a silicone resin, an acryl based reactive resin, an epoxy-polyamide resin, a nitrocellulose-melamine resin, a mixture of a high molecular weight polyester resin and an isocyanate prepolymer, a mixture of a methacrylic acid copolymer and a diisocyanate prepolymer, a mixture of a polyester polyol and a polyisocyanate, a urea-formaldehyde resin, a mixture of a low molecular weight glycol, a high molecular weight diol and triphenylmethane triisocyanate, a polyamine resin, and mixtures thereof can be used.

The coating of the magnetic substance coating solution in the desired amount can be carried out by air doctor coating, blade coating, air knife coating, squeeze coating, dip coating, reverse roll coating, transfer roll coating, gravure coating, kiss coating, cast coating, spray coating, etc., which are described in detail in *Coating Kogaku* (*Coating Engineering*), published by Asakura Shoten, Tokyo, pp. 253 to 277 (Mar. 20, 1971).

Fibrous materials which can be used in this invention are essentially of a textile nature, and include nonwoven materials, synthetic leathers, woven materials of synthetic fibers, woven materials of natural fibers and Japanese paper. The thickness of the fibrous materials is preferably about 20 to about 2,000 $\mu$m, even more preferably from 30 to 100 $\mu$m.

The nonwoven materials are fabric-like products which are made by arranging fibers such as acetate, nylon polyester, etc., in a web or mat form by a conventional method and then bonding the fibers to each other using an adhesive such as a natural latex, e.g., a latex of natural rubber, a synthetic latex or such in combination with a urea resin or a melamine resin adhesive, or by utilizing the adhesive force of the fibers themselves, e.g., when using polyethylenes, polypropylene or a polyamide. Of the synthetic lattices, acrylonitrile-butadiene copolymers and acrylonitrile are preferred, with synthetic lattices of a molecular weight of about 800 to about 10,000 being most preferred.

In addition, other nonwoven materials, e.g., those which are made through fusion bonding can also be used, e.g., polyesters, polystyrenes and polyvinyl acetate, with usually a temperature of about 70° to about 250° C being used for the bonding.

Many of the nonwoven materials disclosed above are commercially available as nonwoven fabrics, e.g., Vilene H-8103 (polyethylene terephthalate fiber), Vilene BX10, Vilene #3000, Vilene #4000 (produced by Japane Vilene Co., Ltd.), Nippon Cloth #1500, Nippon Cloth #1600 (produced by Nippon Cloth Industries Co., Ltd.), as are fibers of copolymers of polyethylene terephthalate (60 mol%) and rayon (40 mol%) bonded using a styrenebutadiene rubber as an adhesive and then formed into a sheet.

The woven materials of synthetic fibers include those made of synthetic fibers of a high molecular weight, as is conventional in the synthetic fiber art, e.g., polyamides such as nylon-6, nylon-6,6 or nylon-6,10; polyesters such as polyethylene terephthalate or polyethylene naphthalate; polyurethanes produced by reacting hydrazine, a diamine or a diol with a prepolymer formed by reacting a polyester or polyether with a diisocyanate; polyolefins such as polyethylene or polypropylene; polystyrene; polyvinyl chloride; polyvinylidene chloride; polyfluoroethylene; polyacrylonitrile; polyvinyl alcohol; etc.

The woven materials of natural fibers are those made from protein fibers such as wool or silk; cellulose fibers such as cotton or hemp; etc.

Japanese paper is made from natural fibers, cellulose fibers being preferred, using bast fibers as a raw material, digesting the fibers to make single fibers and then making a paper therefrom. Bast fibers consist of celluloses about 3 to about 50 mm long by about 0.01 to about 0.08 mm wide. Examples of such are flax, hemp, jute, ramie, kozo, mitsumata and gampi. Of these fibers, kozo, mitsumata and gampi are preferred.

The above fibrous materials are laminated on a base sheet using an adhesive or by thermocompression bonding, typically at about 1 Kg/cm$^2$ to about 25 Kg/cm$^2$ and at about 70° C to about 150° C for about 1 to about 30 min., though these conditions are not mandatory.

In this case, it has been found that a fibrous material impregnated with a silicone oil, for example, a polymer of dimethyl dichlorosilane, fluorine oil or the like is very useful for preventing a magnetic head from later becoming dirty. Typically, impregnation is by spraying after adhering the fiber to the base sheet using about 0.5 to about 10 wt% of the oil, based on the fibrous material weight.

The aforesaid adhesives used in this invention include natural latexes, synthetic latexes and such latexes in combination with a urea or melamine resin adhesive, a synthetic rubber, a polyester, a vinyl acetate resin, a butyral resin, an acrylate resin, a vinyl chloride resin, a polyamide, a reclaimed rubber, starch, dextrin, glue, gum arabic, casein, polyvinyl alcohol, polyacrylamide, carboxymethyl cellulose, rosins, wax, paraffin, epoxy resins, isocyanate resins, phenyl resins, furan resins, nitrocellulose, etc. Preferred are those resins which have a softening point of about 30° to about 150° C, most preferably 50° to 120° C, and a molecular weight of about 1,000 to about 100,000. They are conveniently applied with a spray-gun, brush, blade, spatula, etc.

Examples of conveniently used adhesives are copolymers of vinyl chloride and vinyl acetate (about 30 to 90 wt% vinyl acetate), copolymers of ethylene and vinyl acetate (about 30 to 90 wt% vinyl acetate), terpene resins, copolymers of acrylonitrile and butadiene (about 20 to 40 wt% acrylonitrile) liner polyesters (copolymers of ethylene glycol and terephthalic acid at a 3:2 to a 2:3 molar ratio, respectively) and polyamide terpolymers (for example, caprolactam (20 to 80 wt%): lauryollactam (5 to 70 wt%): γ-methyl caprolactam (5 to 60 wt%).

In the case of laminating the fibrous material on the base sheet by thermocompression bonding, the fibrous material or at least a portion of the constituents of the fibrous material, e.g., an adhesive for the fibrous or base sheet, must be a thermoplastic resin. Preferably, both the fibrous material and base sheet comprise or are made of a thermoplastic resin.

Preferred of such thermoplastic resins are those which have a softening point of 150° C or less, an average molecular weight of about 10,000 to about 200,000 and a polymerization degree of about 200 to about 500, e.g., polypropylene-vinyl chloride copolymers, ABS resins, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyamides, etc.

In FIGS. 3 and 4, reference numeral 10 indicates a flat box-like cartridge comprising a cartridge wall (usually having a thickness of about 1 to about 5 mm), and having an inner space in which at least the above cleaning disc 1 can be placed so as to be rotatable.

Cartridge 10 is provided with opening 11 on the side thereof, whereby cleaning disc 1 can be inserted into and removed from cartridge 10. Upper plate 10a and lower plate 10b are shown, with a center hole 12 having a slightly larger diameter than the above center hole 5, hole 13 having a slightly larger diameter than the above hole for light sector 6 (a small opening which can also be called an index sector; the light sector detects light transmitted through the light sector 6 to produce a pulse signal, whereby the rotation rate of the magnetic sheet can be appropriately controlled), and slit 14 through which a magnetic head can be inserted, being provided.

When the light sector is not used, hole 13 is not necessarily provided, and slit 14 in the lower plate 10b is not necessarily provided if the load pad as hereinafter described is not used.

In cartridge 10, the inner surface of the lower plate 10b facing magnetic layer 3 is provided with a lubricating layer 15 comprising a synthetic paper or non-woven fabric soaked with a silicone resin, Teflon, a silicone oil, etc., in order to improve the ease of rotation of the cleaning disc 1, in the same manner as used in providing the fibrous material layer 4.

The cartridge of the present invention is produced by placing the cleaning disc 1 in the cartridge 10 in the manner shown in FIG. 4.

The action of the cartridge will now be described in more detail.

The cartridge 10, in which the cleaning disc 1 is placed as shown in FIG. 4, is mounted on a recorder for a flexible disc 30 as shown in FIG. 5. When the cleaning disc 1 is rotated in the same manner as a magnetic disc, it shows a greatly reduced rotation starting torque due to the good lubricity of the lubricating layer 15 and an electrostatic charge preventing effect due to the magnetic layer 3, as a result of which very smooth rotation is obtained.

Thereafter, a magnetic head 31 is inserted from above through slit 14 of the upper plate 10a and is brought into contact with the fibrous material layer 4 of the cleaning disc 1 which has reached a predetermined rotation speed. As desired or necessary, a load pad 32 may be inserted from below through slit 14 of the lower plate 10b so that loading of the cleaning disc 1 through contact between the cleaning disc 1 and the magnetic head 31 is prevented. When they are contacted with each other for a period of about several seconds to several ten seconds, dust, foreign particles, dirt, etc., attached to the surface of the magnetic head 31 are materially (substantially 100%) transferred onto the fibrous material layer 4. Thus, a clean head surface can be obtained in a short period of time.

It will apparent that even if the fibrous material layer 4 is placed below and the magnetic layer 3 and the lubricating layer 15 are placed above, depending upon the kind of the recorder for flexible disc, no mechanical problems will occur.

The form of each of the cleaning disc and the cartridge may be circular, oval or rectangular, so long as the rotation of the cleaning disc 1 placed in the cartridge 10 is not hindered.

By using the cartridge of the present invention, the following novel effects are obtained.

1. The provision of magnetic layer 3 on one or both sides of the support makes it possible to greatly reduce the amount of electrostatic charging produced through friction at the start of the rotation of the cleaning disc 1. As a result, the rotational starting torque is markedly reduced and rotation is smoothened.

2. The provision of the lubricating layer 15 on the inner surface of the cartridge 10 facing the magnetic layer not carrying thereon fibrous material layer 4 in the dual-layer magnetic layer embodiment or facing the magnetic layer 3 in the mono-layer magnetic layer embodiment greatly reduces frictional resistance at the start of rotation and during rotation of the cleaning disc 1. As a result, it is possible to greatly reduce damage to the cleaning disc 1 due to rotational starting torque and friction.

3. The cleaning disc can be produced using a flexible disc on one or both sides of which a magnetic layer is provided. In this case, therefore, it is not necessary to prepare any special support or magnetic layers for the cleaning disc, and the production costs of the cleaning disc can be greatly reduced.

The novel effects of the cartridge of the present invention will be illustrated in more detail by the following examples in which Example 1 and Comparison Example 1 relate to the dual-magnetic layer embodiment of the present invention and Example 2 relates to the mono-magnetic layer embodiment.

EXAMPLE 1

A magnetic substance coating dispersion having the composition shown below was coated on both sides of a support comprising a 75 $\mu$ thick polyethylene terephthalate film by a gravure coating method to provide $\mu$ thick magnetic layers.

| Composition of the Magnetic Substance Coating Dispersion | |
|---|---|
| | parts by weight |
| $\gamma$-Fe$_2$O$_3$ (size 0.3 $\mu$ × 0.1 $\mu$) | 300 |
| Vinyl Chloride-Vinyl Acetate Copolymer (87/13 molar ratio; average molecular weight 300) | 30 |
| Acrylonitrile-Styrene Copolymer (74/26 molar ratio; average molecular weight 350) | 20 |
| Carbon Black (size 0.1 $\mu$ × 0.2 $\mu$) | 20 |
| Chromium dioxide (size 0.2 $\mu$ × 0.3 $\mu$) | 10 |
| Silicone Oil | 4 |
| Methyl Ethyl Ketone | 720 |

Thereafter, a molten thermoplastic adhesive (STAFIX, a polyester copolymer applied in a thickness of 30 to 150 $\mu$, produced by Fuji Photo Film Co., Ltd.) was coated on one surface of one of the magnetic layers, and on this coating surface was placed a 200 $\mu$ thick non-woven fabric (Vilene #3000 manufactured by NIHON Vilene, a polyester synthetic fiber comprising an acrylic type resin binder; the material is soft and is resistant to abrasion). They were then bonded together using a pair of rollers set at the following conditions: pressing load of 1 Kg/cm; a temperature of 100° C; total a period of 1 minute for the sheet to pass between the element; and then allowed to cool to room temperature. Then, the member so bonded was cut in the form of a doughnut having an outer diameter of 200 ± 0.5 mm and an inner diameter of 25.4 ± 0.05 mm (as as shown in FIG. 1); thus, a cleaning disc was obtained.

A flat box as shown in FIG. 3 was produced using a 0.25 mm thick hard vinyl chloride plate. Onto the inner surface of the lower plate was bonded a 200 $\mu$ thick non-woven fabric (Vilene #TR 35, produced by SANKO Vilene, a rayon non-woven fabric comprising an acrylic resin binder; the material is soft and resistant to abrasion) which had been impregnated with silicone oil in an amount of about 10 cc/m$^2$. Bonding was at the following conditions 200° C and 1 Kg/cm$^2$ for about 5 seconds using a heat-bonding machine, whereby a cartridge was obtained.

The dimensions of the plane of the above cartridge was 20.5 cm × 20.5 cm, and the inner space (in the direction of the thickness of the cleaning disc) was 1.0 mm.

The cleaning disc and cartridge so produced were mounted on a recorder for flexible discs as shown in FIG. 4. While the cleaning disc was rotated at 360 r.p.m. and the magnetic head was brought into contact with the fibrous material layer, the rotational properties of the cleaning disc and the insulating resistance of the lower surface (in this case, corresponding to the surface of the magnetic layer free of the fibrous material layer) of the cleaning disc were observed and measured.

As a result, the cleaning disc smoothly rotated from the start of rotation, and, on continuing the rotation, it was confirmed that the insulating resistance of the lower surface of the cleaning disc remained at a surface resistance value of 10$^9$ to 10$^6$ $\Omega$ and that the smooth rotation of the cleaning disc was maintained.

COMPARISON EXAMPLE 1

A coating solution of the composition shown below was coated on one surface of a 50 $\mu$m thick vinyl chloride sheet in a thickness of 10 $\mu$m and dried. Thus, a cleaning disc carrying an abrasive layer was obtained.

|  | parts by weight |
| --- | --- |
| $Cr_2O_3$ (abrasive of 10,000 mesh) | 100 |
| Epoxy Resin | 30 |
| Polyamide Resin | 30 |
| Vinyl Chloride-Vinyl Acetate Copolymer | 40 |
| Methyl Ethyl Ketone | 450 |
| Butanol | 50 |

The epoxy resin is a copolymer of bisphenol A and epichlorohydrin; hydroxy group content 0.16; epoxy content: 0.36 to 0.44; specific gravity: 1.18 at 20° C; molecular weight: 470.

The polyamide resin was a condensate of (hexamethylenediamine and sebasic acid; amine value: 300 ± 20; viscosity: 50,000 to 60,000 centipoise; molecular weight: about 2,000.

The vinyl chloride-vinyl acetate copolymer had a ratio of vinyl chloride: vinyl acetate of 87/13/(molar); molec. wt. : cu 4,000.

This cleaning disc was cut to the same size as in Example 1, and introduced into the same cartridge as in Example 1 except that no lubricating layer was provided. This cartridge was mounted on a recorder for flexible discs, and the cleaning disc was brought into contact with the magnetic head and rotated at 360 r.p.m. under the conditions used in Example 1. While contacting the head from above, the rotational properties of the cleaning disc and the insulating resistance of the lower surface (in this case, corresponding to the other surface of the vinyl chloride disc) of the cleaning sheet were observed and measured.

As a result, the cleaning disc lacked smoothness of rotation at the start of the rotation, and, on continuing the rotation for 5 minutes while strongly pressing the lower surface of the disc to the inner surface of the lower plate of the cartridge, the cleaning disc finally would not rotate.

Immediately thereafter, the surface resistance value of the lower surface of the disc was measured, and it was found to be $10^{16}$ to $10^{14} \Omega$.

EXAMPLE 2

The procedure of Example 1 was duplicated except that the magnetic substance coating dispersion having the composition shown in Example 1 was coated on only one side of the 75 μ thick polyethylene terephthalate film to provide a 4 μ thick magnetic layer, and, of course, that the molten thermoplastic adhesive was coated on the surface of the above support which did not carry the magnetic layer, whereafter the 200 μ thick non-woven fabric was heat-bonded using the molten thermoplastic adhesive as described in Example 1. After insertion into the cartridge obtained as Example 1, the cleaning disc and cartridge so produced were mounted on a recorder as shown in FIG. 4 and thereafter a magnetic head was cleaned and in accordance with the procedure described in Example 1. After conducting measurements as in Example 1, it was confirmed that the insulating resistance of the lower surface of the cleaning disc stopped at a surface resistance value of $10^9$ to $10^6 \Omega$ and that the smooth rotation of the cleaning disc was maintained.

While the invention has been described in detail and with reference to specific embodiments thereof, it will be apparent to one skilled in the art that various changes and modifications can be made therein without departing from the spirit and scope thereof.

What is claimed is:

1. A cartridge for cleaning magnetic heads for use with a flexible disc which comprises:
   a cleaning disc comprising a flexible and non-magnetic support, a magnetic layer provided on both surfaces of the flexible and non-magnetic support, and a fibrous material layer for contact with the magnetic head for cleaning thereof provided on one layer of the magnetic layers; and a flat box-like cartridge with a lubricant layer provided on the inner surface of the flat box-like cartridge which faces the exposed magnetic layer of the cleaning disc, which flat box-like cartridge rotatably accomodates the cleaning disc.

2. A cartridge for cleaning magnetic heads for use with a flexible disc which comprises: a cleaning disc comprising a flexible and non-magnetic support, a magnetic layer provided on one surface of the flexible and non-magnetic support, and a fibrous material layer for contact with the magnetic head for cleaning thereof provided on the surface free of a magnetic layer; and a flat box-like cartridge with a lubricating layer provided on an inner surface of the flat box-like cartridge which faces the exposed magnetic layer of the cleaning disc, which flat box-like cartridge rotatably accomodates the cleaning disc.

* * * * *